United States Patent
Asano et al.

(10) Patent No.: US 10,343,057 B2
(45) Date of Patent: Jul. 9, 2019

(54) VIDEO GAME PROCESSING APPARATUS AND VIDEO GAME PROCESSING PROGRAM

(71) Applicant: KABUSHIKI KAISHA SQUARE ENIX, Tokyo (JP)

(72) Inventors: Tomoya Asano, Tokyo (JP); Masashi Takahashi, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 338 days.

(21) Appl. No.: 13/977,191

(22) PCT Filed: Dec. 28, 2012

(86) PCT No.: PCT/JP2012/008430
§ 371 (c)(1),
(2) Date: Dec. 4, 2013

(87) PCT Pub. No.: WO2014/061071
PCT Pub. Date: Apr. 24, 2014

(65) Prior Publication Data
US 2014/0128154 A1 May 8, 2014

(30) Foreign Application Priority Data
Oct. 18, 2012 (JP) .................. 2012-231241

(51) Int. Cl.
*A63F 13/00* (2014.01)
*A63F 13/40* (2014.01)
*A63F 13/30* (2014.01)

(52) U.S. Cl.
CPC .............. *A63F 13/10* (2013.01); *A63F 13/12* (2013.01); *A63F 2300/556* (2013.01); *A63F 2300/636* (2013.01); *A63F 2300/807* (2013.01)

(58) Field of Classification Search
CPC .... A63F 13/10; A63F 13/12; A63F 2300/556; A63F 2300/636; A63F 2300/807
See application file for complete search history.

(56) References Cited

U.S. PATENT DOCUMENTS

| | | | |
|---|---|---|---|
| 6,884,169 B2 | 4/2005 | Tsuchida et al. | |
| 7,794,321 B2 | 9/2010 | Asano | |

(Continued)

FOREIGN PATENT DOCUMENTS

| | | |
|---|---|---|
| JP | 2009-039224 | 2/2009 |
| KR | 10-2005-0077812 | 8/2005 |

OTHER PUBLICATIONS

Dead or Alive 4 Tag Throws HD uploaded by qwerasdf011 Feb. 2, 2010 https://www.youtube.com/watch?v=sdttKVIxTxI.*

(Continued)

*Primary Examiner* — Tramar Y Harper
*Assistant Examiner* — Jeffrey K Wong
(74) *Attorney, Agent, or Firm* — Greenblum & Bernstein, P.L.C.

(57) ABSTRACT

A video game processing apparatus for controlling progress of a video game including a turn-based battle against an enemy character by displaying a player character on a display screen of a display device includes a profile information storage section for storing summon admissibility information in which a battle command used in the turn-based battle is associated with other player character that carries out an action corresponding to the battle command; receives the summon admissibility information from other video game processing apparatus in which the other player character is used as a main character; receives a summoning request indicating a usage request of the summon admissibility information in the turn-based battle; determines summon admissibility information to be used in a case where the summoning request is received; and summons the other (Continued)

player character indicated by the determined summon admissibility information to be caused to carry out the action.

18 Claims, 11 Drawing Sheets

(56) References Cited

U.S. PATENT DOCUMENTS

| | | | |
|---|---|---|---|
| 2004/0087371 A1 | 5/2004 | Yamana et al. | |
| 2004/0087372 A1 | 5/2004 | Yamana et al. | |
| 2004/0259634 A1* | 12/2004 | Machida | A63F 13/10 463/29 |
| 2007/0260687 A1* | 11/2007 | Rao et al. | 709/204 |
| 2007/0270226 A1* | 11/2007 | York et al. | 463/43 |
| 2007/0281791 A1 | 12/2007 | Ichikawa et al. | |
| 2008/0004117 A1* | 1/2008 | Stamper | G07F 17/32 463/42 |
| 2009/0042629 A1 | 2/2009 | Yamashita et al. | |
| 2012/0142429 A1* | 6/2012 | Muller | 463/42 |

OTHER PUBLICATIONS

Dead or Alive 4: Online by Anoop Gantayat for IGN Dec. 8, 2005 http://www.ign.com/articles/2005/12/09/dead-or-alive-4-online.*

Xbox 360 How to add friends uploaded by Jason Mcpherson Oct. 14, 2012 https://www.youtube.com/watch?v=pZpR1L6mB6k.*

Dead or Alive 4—Select your character uplaoded by LetsPlayShadigo Jul. 18, 2012 https://www.youtube.com/watch?v=QtRDOVs5wbE.*

Dragon's Dogma Gameplay—Pawn Guide—OXM Uploaded by officialxboxmag Mar. 26, 2012 https://www.youtube.com/watch?v=qEsVmmXQqWA.*

Korea Office Action in Korean Patent Application No. 10-2013-7016868, dated Sep. 16, 2014.

Dengeki Online, avaiable at URL:http://news.dengeki.com/elem/000/000/512/512644/, dated Jan. 16, 2013.

U.S. Appl. No. 13/855,231 to Shingo Kosuge, filed Apr. 2, 2013.

International Search Report (ISR) in International Application No. PCT/JP2012/008430, dated Feb. 26, 2013.

Office Action from Japan Patent Office (JPO) in Japanese Patent Application No. 2012-231241, dated Feb. 26, 2013.

Ascii Media Works Inc., "Shock like being hit by SANDAGA, release of the latest information of the Braverly Default including a new character, Ring Abel," Dengeki Online, Aug. 3, 2012, [search date: Jan. 16, 2013], availabel at <url: http://news.dengeki.com/elem/000/000/512/512644>.

Aetas, Inc., "Release of the detailed information of PSP2 infinity's new system, Friend Search, the game player let passing other characters join the game as oen support chracter," 4Gamer.net, Dec. 8, 2010, [search date: Jan. 16, 2013], availabel at <url: http://www.4gamer.net/games/119/G011900/20101206012>.

* cited by examiner

Fig. 3

PROFILE INFORMATION

| NAME | FRIEND INFORMATION ||||| ... | COMMENT |
| | FRIEND NAME | CLOSENESS | PROFILE INFORMATION OF FRIEND (EXCLUDING FRIEND INFORMATION) | SUMMON ADMISSIBILITY INFORMATION | DATE OF UPDATE | | |
|---|---|---|---|---|---|---|---|
| X | A | 3 | ..... | ..... | 20xx/xx/xx | ... | xxxxx |
|   | B | 2 | ..... | ..... | 20xx/xx/xx | | |
|   | C | 2 | ..... | ..... | 20xx/xx/xx | | |
|   | ⋮ | ⋮ | ⋮ | ⋮ | ⋮ | | |

Fig. 4

SUMMONED ADMISSIBILITY INFORMATION

| LEVEL OF CHARACTER | NAME OF CHARACTER | ... | BATTLE COMMAND | POWER |
|---|---|---|---|---|
| 10 | xxx | ... | ..... | xxxxx |

CLOSENESS CORRECTION INFORMATION

| CLOSENESS | 0 | 1 | 2 | 3 | 4 | 5 | 6 |
|---|---|---|---|---|---|---|---|
| APPLIED DAMAGE CORRECTION FACTOR | 100 | 100 | 150 | 200 | 250 | 300 | 350 |
| PROBABILITY CORRECTION FACTOR FOR STATE ADDITION | 10 | 20 | 30 | 40 | 50 | 60 | 70 |
| CONTINUATION CORRECTION FACTOR FOR STRENGTHENING /WEAKENING-RELATED ABILITY | 0 | 0 | 1 | 2 | 3 | 4 | 5 |
| ⋮ | ⋮ | ⋮ | ⋮ | ⋮ | ⋮ | ⋮ | ⋮ |

VIDEO GAME PROCESSING APPARATUS AND VIDEO GAME PROCESSING PROGRAM

CROSS REFERENCE TO RELATED APPLICATIONS

The present application is a U.S. national phase application under 35 U.S.C. § 371 of PCT Application No. PCT/JP2012/008430, filed on Dec. 28, 2012.

TECHNICAL FIELD

The present invention related to technique for controlling progress of the video game.

BACKGROUND ART

Heretofore, in turn-based video games, a lot of video games in each of which, when a turn for a player is started, an input of a command for a character (player character) operable by the player is received and the player character is caused to operate in accordance with the received command are proposed.

In such video games, there is one that is configured so as to: select one character among a plurality of characters in response to an operational input of a player during a turn for the player; and cause the selected character to carry out a command (see Patent Literature 1, for example).

PRIOR ART LITERATURE

Patent Literature

[Patent Literature 1] Japanese Patent Application Publication No. 2009-39224

SUMMARY OF THE INVENTION

Problems to be Solved by the Invention

However, in a conventional turn-based video game, there has been a problem that it is difficult to effectively urge cooperation with other player who plays a game of the same sort.

The present invention has been made in order to solve the problem described above, and it is an object of the present invention to be capable of effectively urging players to cooperate with each other.

Means for Solving the Problem

The video game processing apparatus according to the present invention is a video game processing apparatus for controlling progress of a video game by displaying a player character on a display screen of a display device, the progress of the video game including a turn-based battle against an enemy character, the video game processing apparatus including: a summon admissibility information storage section for storing summon admissibility information, a battle command used in the turn-based battle being associated with other player character that carries out an action corresponding to the battle command in the summon admissibility information; a summon admissibility information receiving section for receiving the summon admissibility information from other video game processing apparatus, the other player character being used as a main character in the other video game processing apparatus; a summoning request receiving section for receiving a summoning request in the turn-based battle, the summoning request indicating a usage request of the summon admissibility information; a usage information determining section for determining summon admissibility information to be used in a case where the summoning request is received; and a summoning section for summoning the other player character indicated by the summon admissibility information determined by the usage information determining section to cause the other player character to carry out the action corresponding to the battle command indicated by the summon admissibility information.

By configuring it as described above, it becomes possible to urge players to cooperate with each other.

The video game processing apparatus may be configured so as to further include: a summoned battle command receiving section for receiving a battle command corresponding to an action to cause the player character to carry out in a turn-based battle according to other video game processing apparatus; and a summoned admissibility information transmitting section for transmitting summoned admissibility information toward the other video game processing apparatus, the battle command received by the summoned battle command receiving section being associated with the player character in the summoned admissibility information.

The video game processing apparatus may be configured so that the summoned battle command receiving section receives, at battle command reception timing in the turn-based battle, the battle command corresponding to the action to cause the player character to carry out in the turn-based battle according to the other video game processing apparatus, the battle command being specified in place of the battle command corresponding to the action to cause the player character to carry out in the turn-based battle.

The video game processing apparatus may be configured so as to further include: a friend information storage section for storing friend information, the friend information containing closeness with other player character; a closeness update result receiving section for receiving an update result of the closeness updated in accordance with a predetermined update rule from the other video game processing apparatus in a case where the player character carries out the action in the turn-based battle according to the other video game processing apparatus; and a friend information updating section for updating the closeness in the friend information in accordance with the update result received by the closeness update result receiving section.

The video game processing apparatus may be configured so as to further include: a friend information storage section for storing friend information, the friend information containing closeness with other player character; a closeness updating section for updating, in accordance with a predetermined update rule, the closeness with the other player character that is caused to carry out the action by the summoning section; a friend information updating section for updating the closeness in the friend information in accordance with the update result by the closeness updating section; and a closeness update result notifying section for notifying the update result by the closeness updating section to the other video game processing apparatus in which the other player character caused to carry out the action by the summoning section is used as a main character.

The video game processing apparatus may be configured so as to further include: a usage information selection screen displaying section for displaying a usage information selection screen for receiving a selection of the summon admissibility information to be used in a case where the summoning request is received; and a usage information selection receiving section for receiving a selection of the summon admissibility information to be used on the usage information selection screen, wherein the usage information determining section determines the summon admissibility information received by the usage information selection receiving section as the summon admissibility information to be used.

Moreover, a video game processing program according to the present invention is a video game processing program for causing a computer to realize functions for controlling progress of a video game by displaying a player character on a display screen of a display device, the progress of the video game including a turn-based battle against an enemy character, the computer including a summon admissibility information storage section for storing summon admissibility information, a battle command used in the turn-based battle being associated with other player character that carries out an action corresponding to the battle command in the summon admissibility information, the video game processing program causing the computer to execute: a summon admissibility information receiving function for receiving the summon admissibility information from other video game processing apparatus, the other player character being used as a main character in the other video game processing apparatus; a summoning request receiving function for receiving a summoning request in the turn-based battle, the summoning request indicating a usage request of the summon admissibility information; a usage information determining function for determining summon admissibility information to be used in a case where the summoning request is received; and a summoning function for summoning the other player character indicated by the summon admissibility information determined by the usage information determining function to cause the other player character to carry out the action corresponding to the battle command indicated by the summon admissibility information.

Advantageous Effects of the Invention

According to the present invention, it is possible to urge players to cooperate with each other.

BRIEF DESCRIPTION OF DRAWINGS

FIG. 3 is an explanatory drawing showing an example of a storage state of profile information.

FIG. 4 is an explanatory drawing showing an example of a storage state of summoned admissibility information.

DETAILED DESCRIPTION OF THE INVENTION

Hereinafter, one embodiment according to the present invention will described with reference to the appending drawings.

Figure 1:
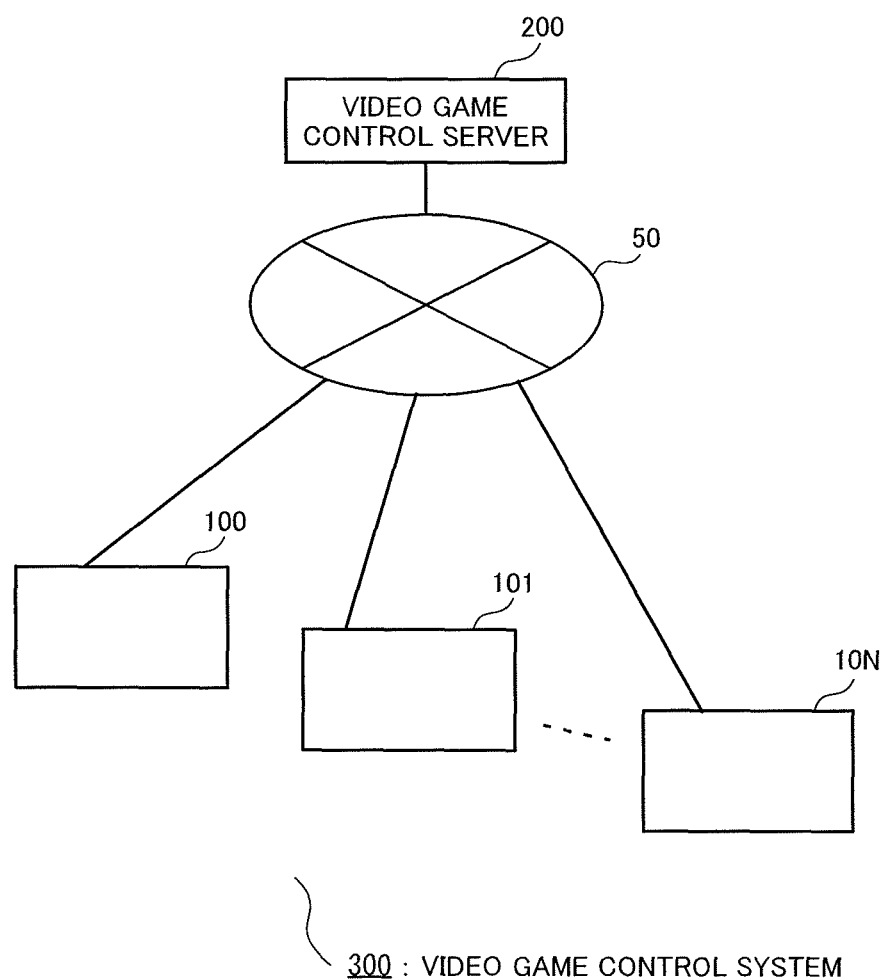
FIG. 1 is an explanatory drawing showing a configuration example of a video game control system.

FIG. 1 is an explanatory drawing showing a configuration example of a video game control system 300 according to one embodiment of the present invention. As shown in FIG. 1, the video game control system 300 includes a plurality of video game processing apparatuses 100 to 10N ("N" is an arbitrary integer), and a video game control server 200.

Each of the plurality of video game processing apparatuses 100 to 10N and the video game control server 200 is connected to a communication network 50 such as the Internet. In this regard, although it is not shown in the drawings, the plurality of video game processing apparatuses 100 to 10N is connected to the communication network 50 by carrying out data communication with a base station managed by a communication carrier by a wireless communication line. In this regard, the configuration of the video game control system 300 is not limited to this. For example, it may include a plurality of servers, and all or a part of the system may be connected to each other by wired.

The video game control system 300 has various kinds of functions for controlling the video game that proceeds in response to operations of users (players) who operate the plurality of video game processing apparatuses 100 to 10N.

The plurality of video game processing apparatuses 100 to 10N have various kinds of functions for controlling progress of the video game in response to operations of the player. Hereinafter, a video game processing apparatus 100 will be described as an example.

Figure 2:
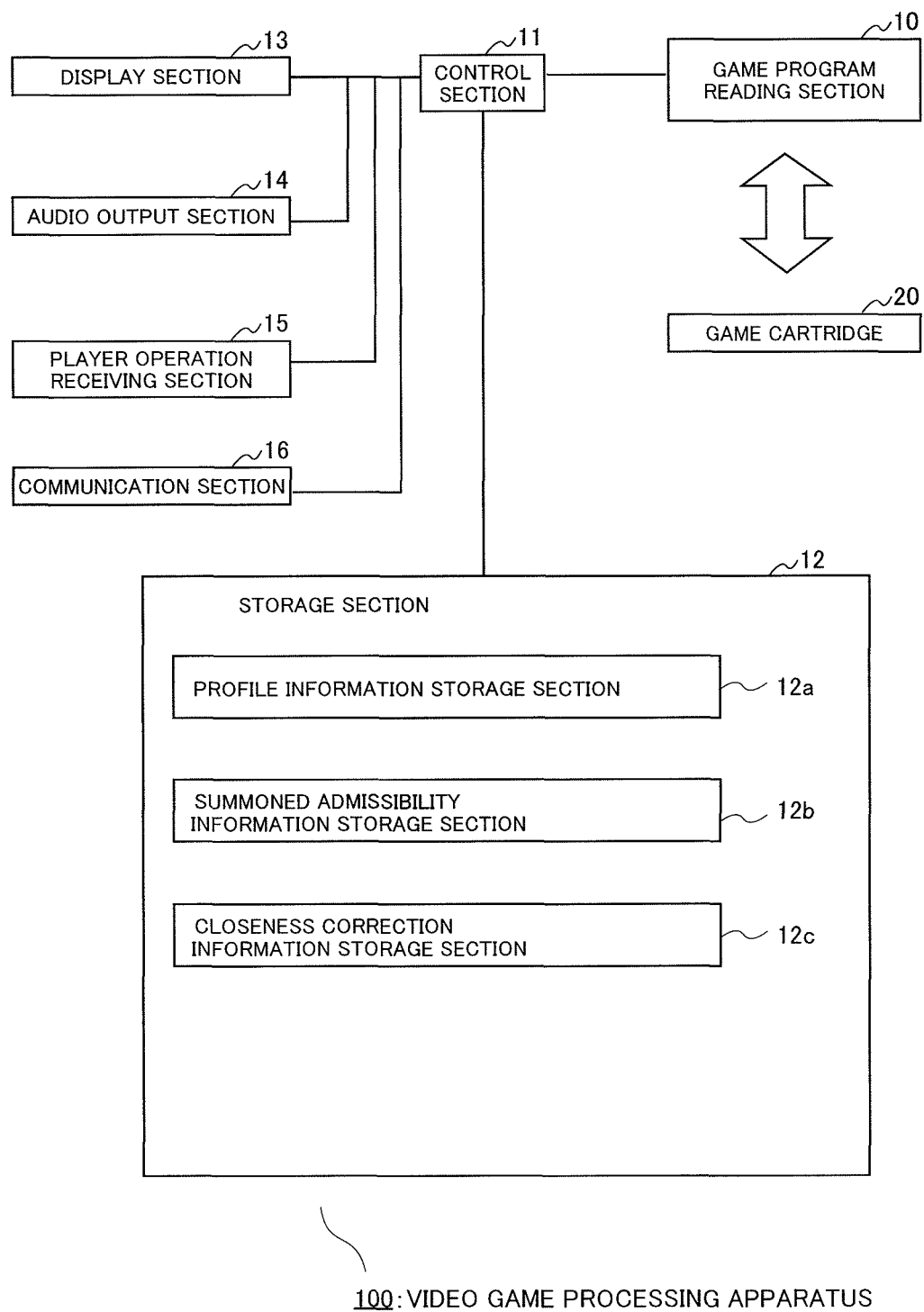
FIG. 2 is a block diagram showing a configuration example of a video game processing apparatus.

FIG. 2 is a block diagram showing a configuration example of the video game processing apparatus 100 according to one embodiment of the present invention. As shown in FIG. 2, the video game processing apparatus 100 includes a game program reading section 10, a control section 11, a storage section 12, a display section 13, an audio output section 14, a player operation receiving section 15, and a communication section 16. Hereinafter, a user who plays the video game using the video game processing apparatus 100 will be explained as a player X.

The program reading section 10 has a function to read out a necessary video game program from a storage medium in which various kinds of video game programs are stored. In this regard, in the present embodiment, the program reading section 10 has a mounting section for detachably mounting the game cartridge 20, in which the video game program is stored, therein. The program reading section 10 reads out the game program from the storage medium of the game cartridge 20, which is mounted into the mounting section by the player X, to store it in the storage section 12. In this regard, a video game executed in accordance with the video game program in the present embodiment may be an RPG, a simulation game, a puzzle game, battle game or the like, so long as it is a video game by which the player X is requested to input a command.

The control section 11 has a function to carry out game programs read out by the program reading section 10 and stored in the storage section 12 and a function to carry out various kinds of controls to cause the video game to proceed in accordance with operations of the player X.

The storage section 12 is a storage medium for storing a video game program and various kinds of data required when to cause the video game to proceed. The storage section 12 is configured by a nonvolatile memory such as a RAM, for example. Various kinds of information to be registered and updated in accordance with progress of the video game and various kinds of information to be used in the video game read out from the storage medium embedded in the game cartridge 20 are stored in the storage section 12.

The display section 13 is a display device for displaying a game screen in response to progress of the video game and operations by the player X in accordance with a control of the control section 11. The display section 13 is configured by a liquid crystal display device, for example. In this regard, the display section 13 may be configured so as to include one display screen, or alternatively, may be configured so as to include two display screens so that a touch panel is provided in one display screen of the two.

The audio output section 14 outputs audio in response to progress of the video game and operations by the player X in accordance with a control of the control section 11.

The player operation receiving section 15 receives an operation signal according to an operation by the player X, and notifies the control section 11 of its result. In the present embodiment, the operation receiving section 15 receives an operation by the player X via a touch panel provided in the display section 13. In this regard, the operation receiving section 15 may be configured so as to receive an operation by the player X via a controller such as a mouse, a game pad and the like.

The communication section 16 is connected to a communication network such as the Internet by wireless or wired connections, and transmits and receives various kinds of information.

Here, an example of the video game carried out in the video game processing apparatus 100 will be described. In the present embodiment, a turn-based battle between a character (player character) operated by the player X and a character (enemy character) operated by a computer (or other player who becomes a correspondent) is carried out in the video game processing apparatus 100. Further, in a turn-based battle, the player X is allowed to "summons" other players (friends) who are registered in advance. Further, the player X is also allowed to cooperate with the friend in order to cause the video game to proceed by "delivering" an action of the player character to the friend. Moreover, each player can register his/her own profile, and a list of his/her own friends (friend list) is also registered in the profile.

The elements of the video game according to the present embodiment also include "closeness". The closeness according to the present embodiment is the degree indicating intimacy between friends, and has seven steps from 0 to 6. The closeness can be increased by summoning the same friend a number of times, and an effect of summoning is enhanced as a friend with higher closeness is summoned.

In order to control progress of the video game described above, in the present embodiment, the storage section 12 contains a profile information storage section 12a, a summoned admissibility information storage section 12b, and a closeness correction information storage section 12c.

The profile information storage section 12a is a storage medium for storing profile information that is information on a profile of the player X.

FIG. 3 is an explanatory drawing showing an example of a storage state of the profile information stored in the profile information storage section 12a. As shown in FIG. 3, the profile information contains a name of the player X, friend information that is information on a friend of the player X, a date of update of the profile information, and a comment inputted by the player.

The friend information contains a friend name, closeness, profile information of the friend, and summon admissibility information. In this regard, in the present embodiment, the content except for the friend information is registered as the profile information of a friend. However, in a case where a friend allows the player X to view friends of the friend, for example, it may be configured so that part or all of the friend information is not to be removed.

Here, the summon admissibility information is information in which a battle command used in a turn-based battle is associated with other player character (for example, a player character operated by a friend A in his/her own video game processing apparatus 101 as a main character) that carries out an action corresponding to the battle command.

The summoned admissibility information storage section 12b is a storage medium for storing summoned admissibility information. The summoned admissibility information is information in which a battle command corresponding to an action to cause a player character to carry out in a turn-based battle is associated with the player character. In the present embodiment, only one piece of summoned admissibility information indicating one action by one character is registered in the summoned admissibility information storage section 12b. In this regard, the storage state of the summoned admissibility information in the summoned admissibility information storage section 12b is not limited to this. For example, it may be configured so that plural kinds of summoned admissibility information are stored in predetermined order (for example, in registered order).

FIG. 4 is an explanatory drawing showing an example of a storage state of the summoned admissibility information stored in the summoned admissibility information storage section 12b. As shown in FIG. 4, the summoned admissibility information indicates a level of a character (player character) operated by the player X, a name of the player character, a battle command, and a power.

Further, the power means a power of an action corresponding to the battle command. In the present embodiment, it is determined by a status of the player character when the summoned admissibility information is stored (a level and/or an offensive power) and the content of the action (which may be a so-called attribute attack, such as an attack-related action, a recovery-related action and the like). The power may be configured so that only a numerical number is simply registered therein, or so that a plurality of elements (for example, a probability that the content of the action becomes successful, information indicating an attribute of the action, and the like) are registered therein.

In the present embodiment, the summoned admissibility information is to be registered during execution of a turn-based battle. However, timing of registering the summoned admissibility information is not limited to this. For example, it may be configured so as to receive registration of the summoned admissibility information by the player X at arbitrary timing.

Figures 5, 6:
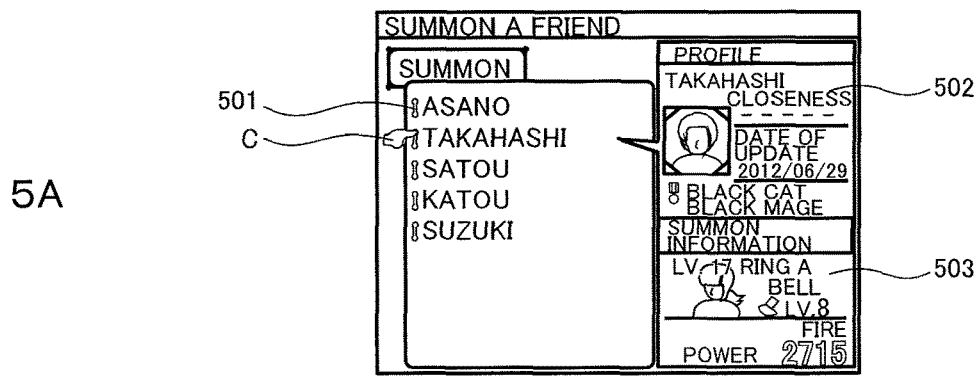
FIG. 5 is an explanatory drawing showing an example of a friend list screen.
FIG. 6 is an explanatory drawing showing an example of a storage state of closeness correction information.

FIG. 5 is an explanatory drawing showing an example of a friend list screen displayed on the display screen of the display section 13 in response to an operation of the player X. As shown in FIG. 5(A), a friend list display area 501 in which a name of a friend of the player X is displayed, a friend profile information display area 502, and a summon admissibility information display area 503 are provided on the friend list screen.

In the present embodiment, the control section 11 displays a name of a friend (for example, "TAKAHASHI" in FIG. 5) and/or closeness according to a position of a cursor C that the player X can operate in the friend profile information display area 502 on the basis of the profile information. Further, the control section 11 similarly displays an image and a level of a main character used by the friend, a name of an action (a command name), and power in the summon admissibility information display area 503. In this regard, in the present embodiment, as shown in FIG. 5(B), closeness between the player X and a friend is indicated by a mark M.

The closeness correction information storage section 12c is a storage medium for storing closeness correction information to be used to determine an effect of closeness.

FIG. 6 is an explanatory drawing showing an example of a storage state of the closeness correction information stored in the closeness correction information storage section 12c. As shown in FIG. 6, the closeness correction information indicates various kinds of correction factors according to closeness. The type of correction factor relates to a type of an action corresponding to the battle command registered as the summoned admissibility information. More specifically, various types of content such as "a correction factor corresponding to the magnitude of damage to be applied (applied damage correction factor)", "a correction factor corresponding to a probability of state addition (probability correction factor for state addition)" and the like, for example, are thought. In this regard, although an action that cannot be enhanced, such as "completely recovery" is thought, for example, it may be configured so that an effect different from a correction factor, such as "an offensive power is also enhanced with a predetermined probability", for example, is set up in such a case.

Next, an operation of the video game processing apparatus 100 according to the present embodiment will be described.

Figure 7:
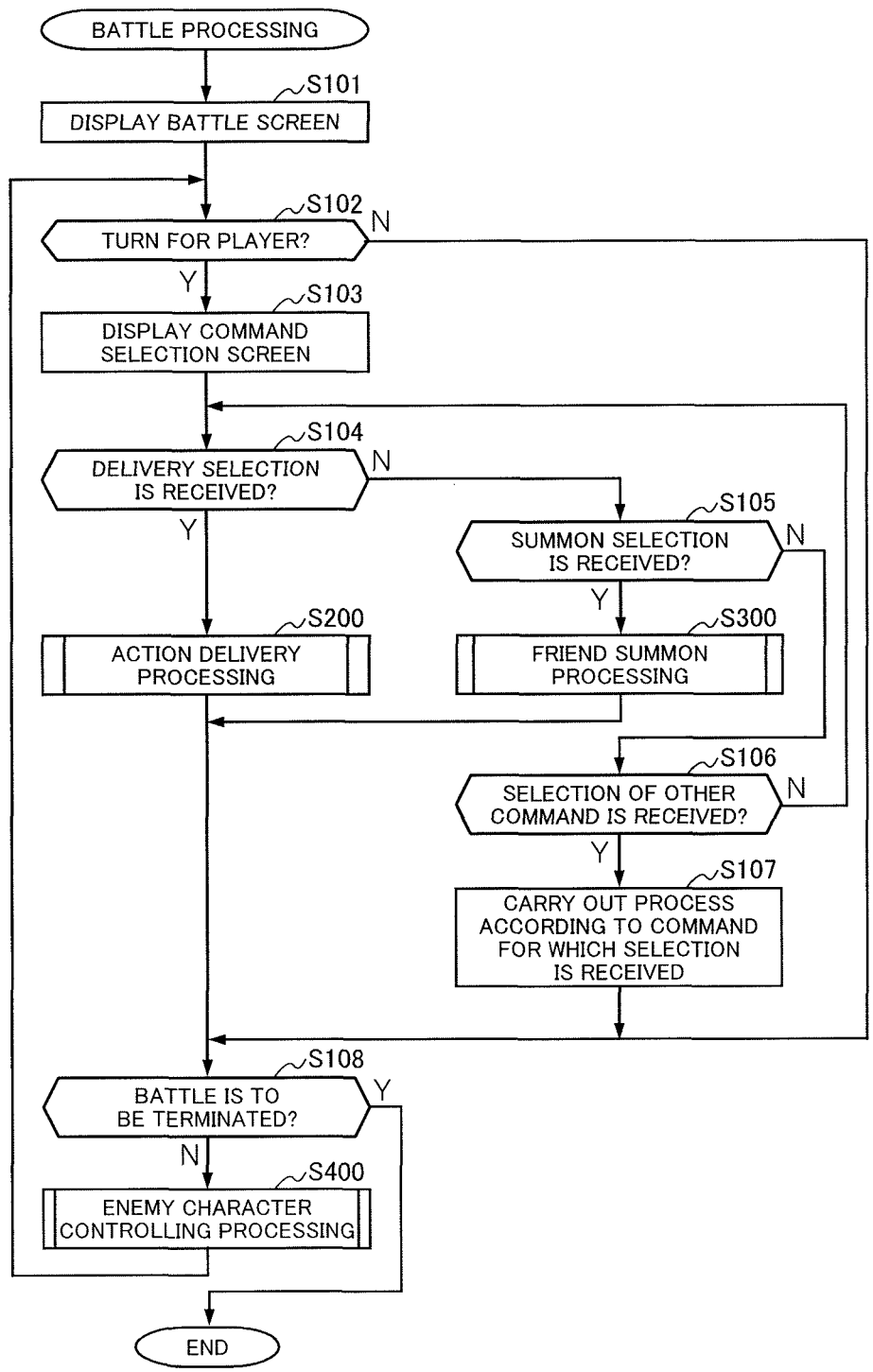
FIG. 7 is a flowchart showing an example of battle processing.

FIG. 7 is a flowchart showing an example of battle processing carried out by the video game processing apparatus 100. In the battle processing, processes for controlling progress of a turn-based battle between a player character and an enemy character (character operated by a computer or other player) are carried out. In this regard, the content of processing with no relationship to the present invention may be omitted.

The battle processing is started when a battle start condition is satisfied in accordance with progress of the game, such as when a player character comes into contact with an enemy character on a field, for example.

In the battle processing, the control section 11 first refers to player character information and enemy character information (information on each character, such as an HP and an MP, not shown in the drawings), and displays a battle screen (not shown in the drawings) (Step S101).

When the battle screen is displayed, the control section 11 determines whether it is a turn for the player X or not (Step S102). Here, in a case where it is determined that it is not a turn for the player X ("No" at Step S102), the control section 11 shifts to a process at Step S108 (will be described later).

On the other hand, in a case where it is determined that it is a turn for the player X ("Yes" at Step S102), the control section 11 displays a command selection screen (Step S103).

Figure 8:
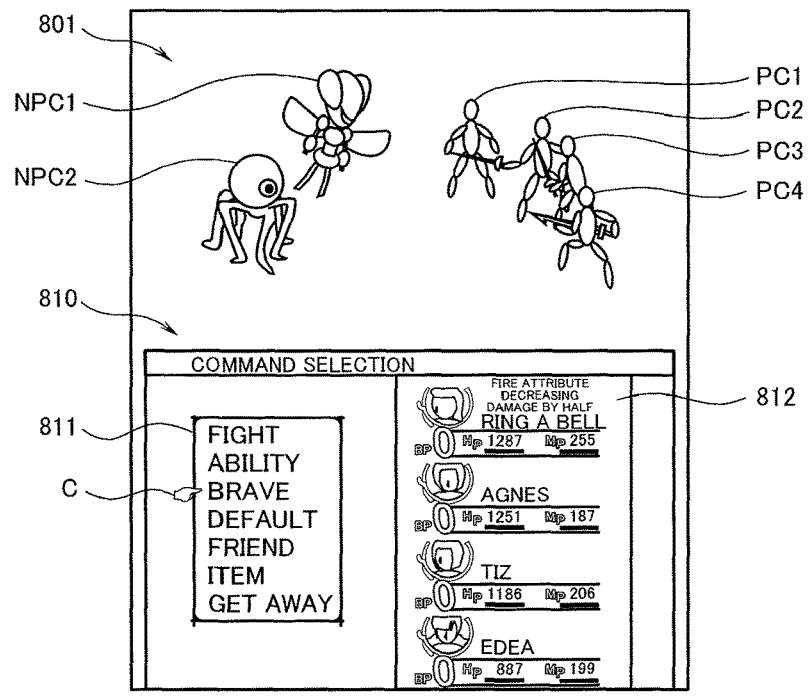
FIG. 8 is an explanatory drawing for explaining an example of a command selection screen.

FIG. 8 is an explanatory drawing for explaining an example of a command selection screen. As shown in FIG. 8, a battle field display area 801 indicating a battle field, and an operation screen display area 810 indicating an image for receiving an operational input by the player X are provided on the command selection screen.

The player characters and the enemy character are displayed on the battle field display area 801. In the present embodiment, the case where four player characters PC1 to PC4 and two enemy characters NPC1, NPC2 are displayed will be described as an example.

A command list image 811 indicating a list of commands, the cursor C that the player X can operate, and a status image 812 indicating various kinds of statuses of the player character (for example, abnormal state, a remaining amount of an HP and the like) are displayed on the operation screen display area 810.

When the command selection screen is displayed, the control section 11 determines whether a delivery selection is received or not (Step S104). Here, in the present embodiment, the control section 11 first displays an additional image, which indicates options of "summons" and "delivery", when the cursor C is positioned at a position at which a character string "friend" is indicated on the command list image 811 (that is, when a command "friend" is selected by the player X).

Figure 9:
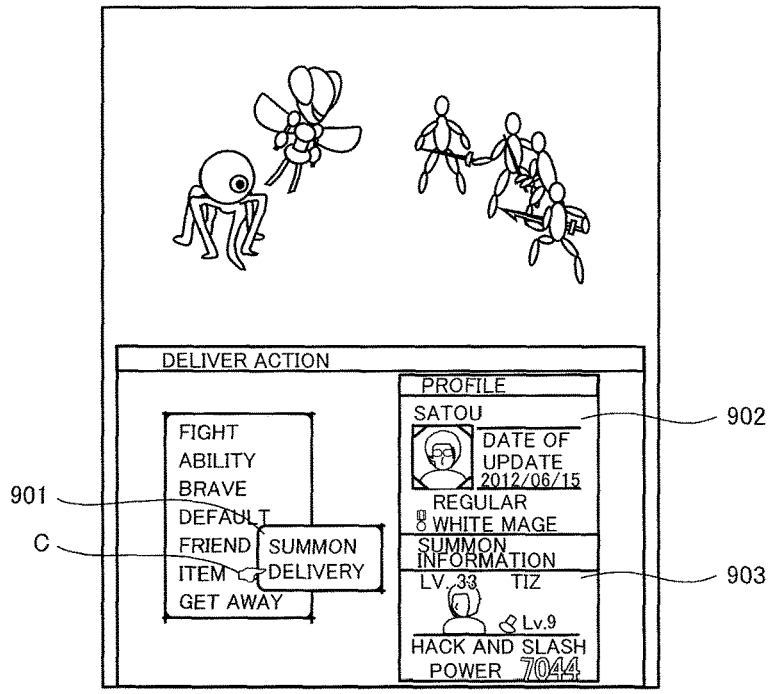
FIG. 9 is an explanatory drawing for explaining an example of the command selection screen.

FIG. 9 is an explanatory drawing for explaining an example of the command selection screen displayed on the display screen at this time. As shown in FIG. 9, the control section 11 displays, in addition to an additional image 901, a player profile display area 902 and a summoned admissibility information display area 903 on the basis of the player X's own profile information and summon admissibility information. This makes it possible to assist determination of the delivery selection by the player X. When the "delivery" is selected by the player X after display of the additional image 901, the control section 11 determines that the delivery selection is received ("Yes" at Step S104), and carries out action delivery processing that is processing for delivering an action (more specifically, the summoned admissibility information) (Step S200). The action delivery processing will be described in detail later (see FIG. 10).

On the other hand, in a case where it is determined that no delivery selection is received ("No" at Step S104), the control section 11 determines whether a summon selection is received or not (Step S105). Here, in a case where it is determined that no summon selection is received ("No" at Step S105), the control section 11 determines whether a selection of the other command (for example, "fight", "ability" or the like, see FIG. 9) is received or not. In a case where it is determined that the selection of the other command is received ("Yes" at Step S106), the control section 11 carries out a process according to the command for which the selection is received (Step S107).

On the other hand, in a case where "summons" shown in the additional image 901 is selected by the player X, the control section 11 determines that the summon selection is received ("Yes" at Step S105), and carries out friend summon processing for summoning a friend (more specifically, a character that carries out the action registered by the friend) (Step S300). The friend summon processing will be described in detail later (see FIG. 13).

When a process according to any of the action delivery processing, the friend summon processing and the command for which the selection is received is carried out (Step S200, S300 or S107), the control section 11 determines whether the battle is to be terminated or not (Step S108). Here, in a case where a win condition of the player X is satisfied because enemy characters are completely destroyed, for example, the control section 11 determines that the battle is terminated ("Yes" at Step S108), and terminates the processing herein.

On the other hand, in a case where it is determined that the battle is not terminated ("No" at Step S108), the control section 11 carries out enemy character controlling processing for controlling an action of an enemy character (Step S400). In the present embodiment, the control section 11 sets up battle commands to two enemy characters NPC1, NPC2 in accordance with a predetermined action rule, for example, and causes a turn for the enemy characters to proceed. Since a known method is used for the enemy character controlling processing, its detailed explanation is omitted herein.

When the enemy character controlling processing is terminated, the control section 11 sifts to the process at Step S102. In this regard, when a lose condition of the player X is satisfied in the turn of the enemy character, the control section 11 determines that it is not a turn for the player X ("No" at Step S102) and the battle is to be terminated ("Yes" at Step S108), and terminates the processing herein.

Figure 10:
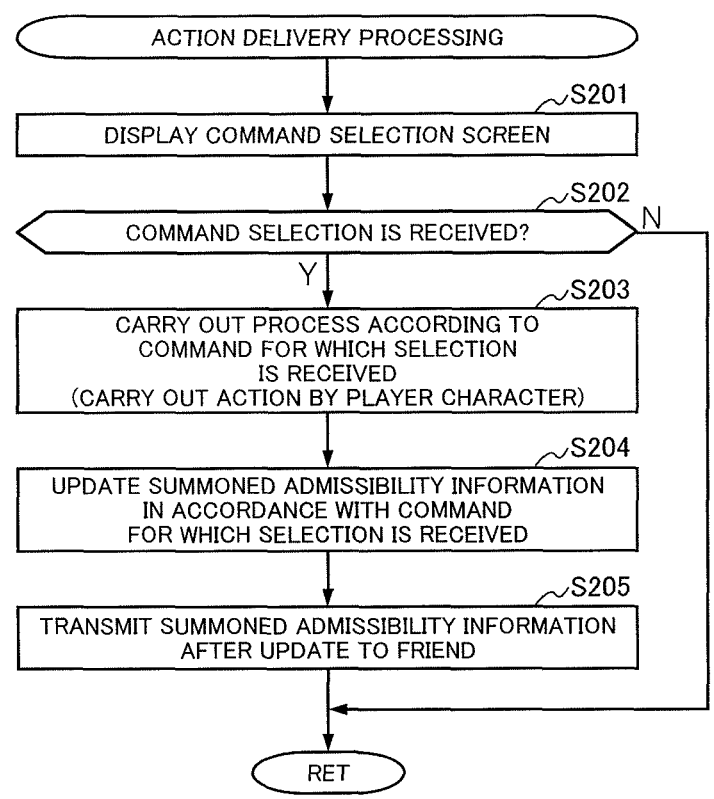
FIG. 10 is a flowchart showing an example of action delivery processing.

FIG. 10 is a flowchart showing an example of action delivery processing carried out by the video game processing apparatus 100. In the action delivery processing, processes for receiving a battle command corresponding to an action to cause a player character to carry out in a turn-based battle according to other the video game processing apparatus 101 and transmitting summoned admissibility information, in which the received battle command is associated with the player character to the other video game processing apparatus are carried out. In this regard, the content of processing with no relationship to the present invention may be omitted.

In the action delivery processing, the control section 11 first displays a command selection screen (Step S201).

Figure 11:
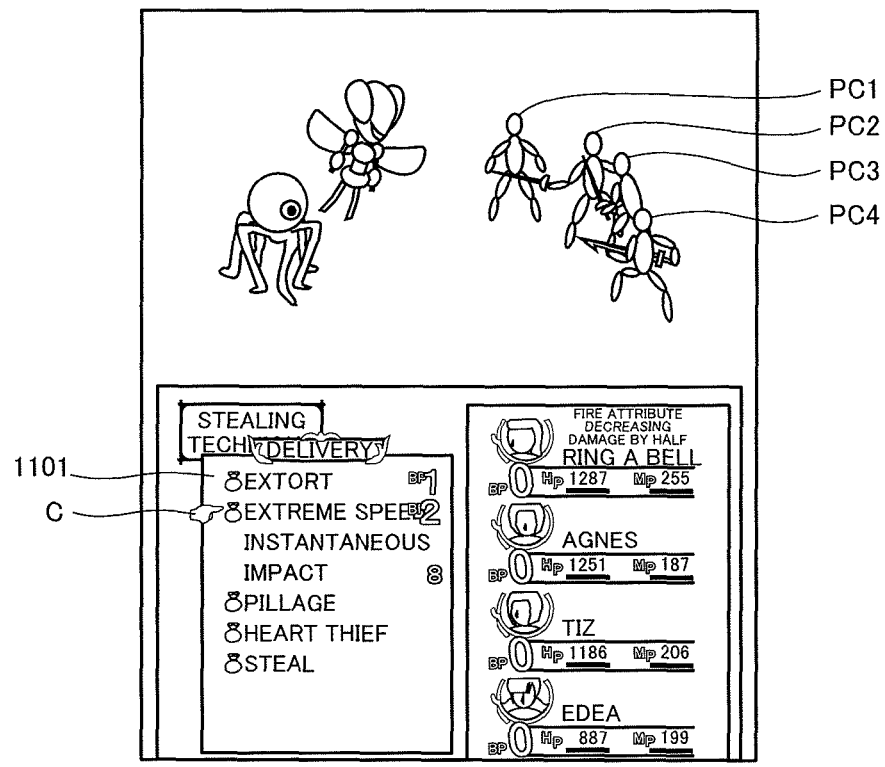
FIG. 11 is an explanatory drawing for explaining an example of the command selection screen.

FIG. 11 is an explanatory drawing for explaining an example of the command selection screen. As shown in FIG. 11, a battle command list display area 1101 for selectably displaying battle commands corresponding to actions to cause the player characters PC1 to PC4 to carry out in a battle is provided on the command selection screen.

When the command selection screen is displayed, the control section 11 determines whether a command selection is received or not (Step S202). Here, in a case where it is determined that no command selection is received, for example, because a predetermined cancel operation is not received ("No" at Step S202), the control section 11 terminates the processing herein, and shifts to the process at Step S108 in the battle processing (see FIG. 7).

On the other hand, in a case where it is determined that a command selection is received, for example, because a battle command "extreme speed instantaneous impact (Shinsokushungeki)" is selected using the cursor C ("Yes" at Step S202), the control section 11 carries out a process according to the command for which the selection is received (Step S203). In the present embodiment, the control section 11 displays a representation screen according to the selected battle command on the display screen, and updates the character information (for example, remaining HP and the like).

Figure 12:
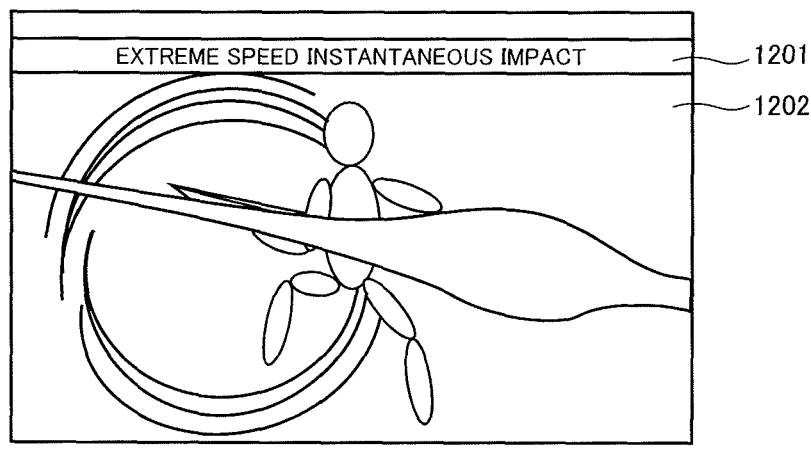
FIG. 12 is an explanatory drawing for explaining an example of a representation screen.

FIG. 12 is an explanatory drawing for explaining an example of a representation screen displayed on the display screen at this time. As shown in FIG. 12, in the present embodiment, a battle command display area 1201 indicating a name of the selected battle command and a player character display area 1202 for displaying the player character that carries out the action corresponding to the selected battle command as a still image or an animated image are provided on the representation screen.

When the process according to the command for which the selection is received is carried out, the control section 11 updates the summoned admissibility information in accordance with the command for which the selection is received (Step S204). In the present embodiment, the control section 11 updates the summoned admissibility information stored in the summoned admissibility information storage section 12b so as to show the battle command selected by the player X and the player character that carries out the action according to the battle command. In this regard, the control section 11 may be configured so as to: generate summoned admissibility information indicating the battle command and the player character; and newly register the generated summoned admissibility information in the summoned admissibility information storage section 12b.

When the summoned admissibility information is updated (Step S204), the control section 11 transmits the summoned admissibility information after update to the friend (Step S205); terminates the processing herein; and shifts to the process as Step S108 in the battle processing (see FIG. 7). In the present embodiment, the control section 11 transmits, at predetermined timing (for example, after the battle is terminated), the summoned admissibility information after update to the video game control server 200 after associating it with identification information of other video game processing apparatus used by the friend. The video game control server 200 then transmits the received summoned admissibility information to any of the plurality of video game processing apparatuses 100 to 10N in accordance with the identification information. In this regard, the method of transmitting the summoned admissibility information is not limited to this. For example, the video game processing apparatus 100 may be configured so as to transmit it directly toward the video game processing apparatus used by the friend (that is, without the video game control server 200).

Figure 13:
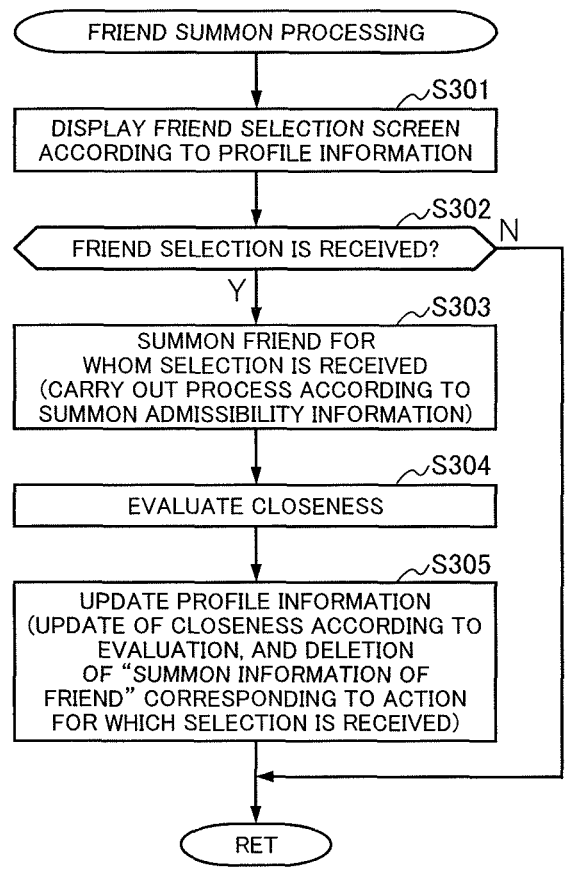
FIG. 13 is a flowchart showing an example of friend summon processing.

FIG. 13 is a flowchart showing an example of the friend summon processing carried out by the video game processing apparatus 100. In the friend summon processing, processes for summoning other friend in a turn-based battle are carried out.

In the friend summon processing, the control section 11 first displays a friend selection screen according to the profile information (Step S301).

Figure 14:
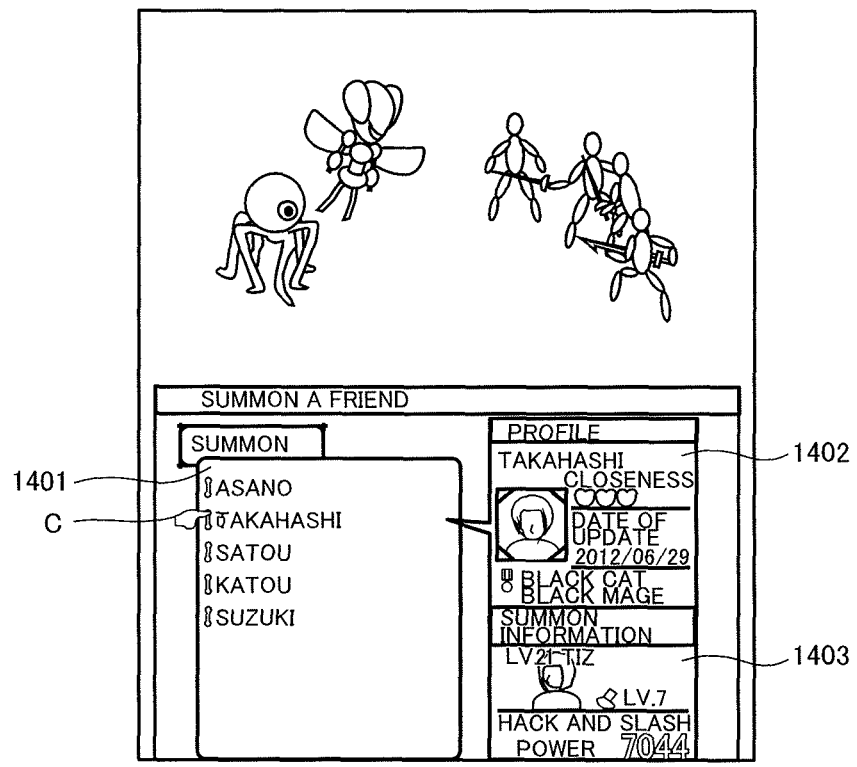
FIG. 14 is an explanatory drawing for explaining an example of a friend selection screen.

FIG. 14 is an explanatory drawing for explaining an example of the friend selection screen. As shown in FIG. 14, a friend list display area 1401 for selectably displaying friends who can be summoned in a battle, a friend profile information display area 1402 for displaying a name of a friend or closeness in accordance with a position of the cursor C, and a summon admissibility information display area 1403 for showing various kinds of information (for example, a level of the character and a battle command) indicated by the summon admissibility information according to the friend are provided on the friend selection screen.

When the friend selection screen is displayed, the control section 11 determines whether a friend selection is received or not (Step S302). Here, in a case where it is determined that no friend selection is received, for example, because a predetermined cancel operation is received ("No" at Step S302), the control section 11 terminates the processing herein, and shifts to the process at Step S108 in the battle processing (see FIG. 7).

On the other hand, in a case where it is determined that the friend selection is received, for example, because one of the friends displayed in the friend list is selected using the cursor C ("Yes" at Step S302), the control section 11 summons the friend for whom the selection is received (Step S303). More specifically, the control section 11 refers to the profile information (see FIG. 3), and carries out a process according to the summon admissibility information associated with the friend for whom the selection is received. In the present embodiment, the control section 11 displays a representation screen according to the summon admissibility information corresponding to the selected friend on the display screen, and updates the character information (for example, a remaining HP and the like). In this regard, at this time, the control section 11 may be configured so as to: receive selection of a plurality of friends; and carry out a process different from one for a single friend on the basis of the summon admissibility information corresponding to each of the plurality of friends for which the selection is received. By configuring it in such a manner, it is possible to provide ranges by a method of summoning a friend.

When the friend for whom the selection is received is summoned, the control section 11 evaluates closeness between the player X and the summoned friend in accordance with a predetermined evaluation criterion (Step S304). In the present embodiment, the control section 11 evaluates the closeness by updating information indicating closeness between friends, which is stored in a predetermined storage area, in accordance with an evaluation criterion created on the basis of the number of times of summon.

When the closeness is evaluated, the control section 11 updates the profile information of the player X (Step S305); terminates the processing herein; and shifts to the process at Step S108 in the battle processing (see FIG. 7). In the present embodiment, the control section 11 updates the closeness indicated by the profile information in accordance with the evaluation result, and updates the profile information in order to delete the used summon admissibility information (that is, the corresponding process has been carried out).

Figure 15:
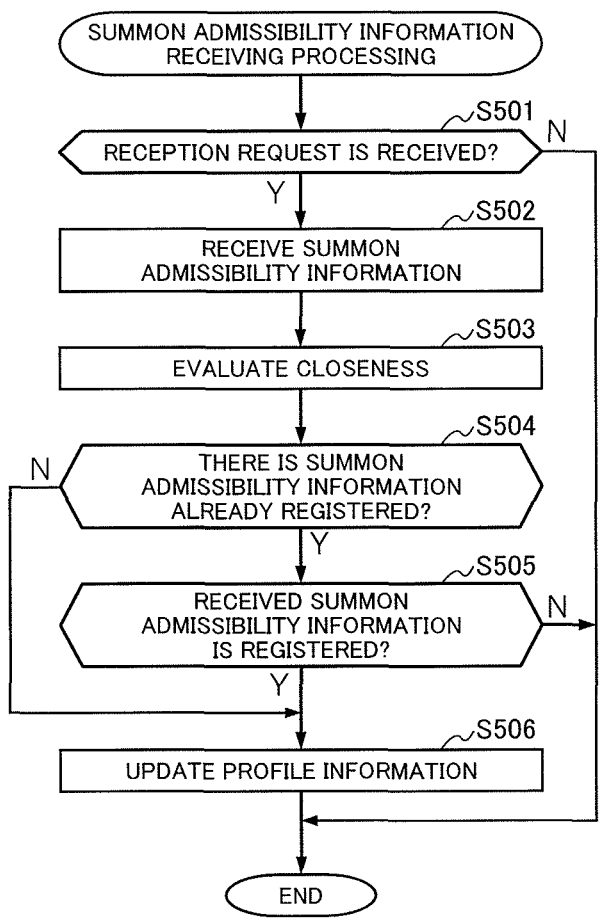
FIG. 15 is a flowchart showing an example of summon admissibility information receiving processing.

FIG. 15 is a flowchart showing an example of summon admissibility information receiving processing carried out by the video game processing apparatus 100. In the summon admissibility information processing, a process to receive summon admissibility information from other video game processing apparatus is carried out.

The summon admissibility information receiving processing is started in a case where the video game processing apparatus 100 is connected to the communication network, for example.

In the summon admissibility information receiving processing, the control section 11 first determines whether a reception request is received or not (Step S501). Here, in a case where it is determined that no reception request is received, for example, because a connection to the communication network is cut ("No" at Step S501), the control section 11 terminates the processing herein.

On the other hand, in a case where it is determined that a reception request is received, for example, because a reception operation of the summon admissibility information by the player X is received ("Yes" at Step S501), the control section 11 receives summon admissibility information (Step S502). In the present embodiment, the control section 11 establishes communication connection to the video game control server 200, and receives summoned admissibility information associated with identification information indicating a friend of the player X as the summon admissibility information.

When the summon admissibility information is received, the control section 11 evaluates closeness between the friend corresponding to the received summon admissibility information and the player X (Step S503). In this regard, an evaluation criterion for the closeness may be configured so as to be different from that when the friend is summoned (see Step S304), or may be configured so as to be the same as it.

When the closeness is evaluated, the control section 11 refers to the profile information, and determines whether summon admissibility information associated with the friend corresponding to the received summon admissibility information exists already or not (Step S504). Here, in a case where it is determined that there is no summon admissibility information that has already been registered ("No" at Step S504), the control section 11 shifts to a process at Step S505 (will be described later), and updates the closeness in accordance with the evaluation result.

On the other hand, in a case where it is determined that there is the summon admissibility information that has already been registered ("Yes" at Step S504), the control section 11 determines whether the received summon admissibility information is registered as part of the friend information contained in the profile information or not (Step S505). Here, in a case where it is determined that the received summon admissibility information is not to be registered, for example, because it exceeds a predetermined registerable number ("No" at Step S505), the control section 11 terminates the processing herein. In this regard, it may be configured so that the control section 11 updates the closeness in accordance with the evaluation result at this time.

On the other hand, for example, in a case where it is determined that determination by the player X is requested and as a result the received summon admissibility information is registered ("Yes" at Step S505), the control section 11 updates the profile information in accordance with the received summon admissibility information and the evaluation result (Step S506).

As explained above, in the embodiment described above, the video game processing apparatus 100 for controlling progress of the video game, which includes a turn-based battle against an enemy character, by displaying the player character on the display screen of the display device is configured so as to: include a summon admissibility information storage section (for example, the profile information storage section 12a) for storing summon admissibility information, a battle command used in the turn-based battle being associated with other player character that carries out an action corresponding to the battle command in the summon admissibility information; receive the summon admissibility information from other video game processing apparatus, the other player character being used as a main character in the other video game processing apparatus (for example, Step S502); receive a summoning request in the turn-based battle, the summoning request indicating a usage request of the summon admissibility information (for example, "Yes" at Step S105); determine summon admissibility information to be used in a case where the summoning request is received (for example, "Yes" at Step S302); and summon the other player character indicated by the determined summon admissibility information to cause the other player character to carry out the action corresponding to the battle command indicated by the summon admissibility information (for example, Step S303). Therefore, it becomes possible to urge players to cooperate with each other.

Namely, since the summon admissibility information relating to other player is stored and can be used in a battle, it is possible to provide an incentive for a player to invite his/her friends to the video game, and it is possible to urge players to cooperate with each other. Further, since synchronization with other video game processing apparatus is not required when the player summons other player, it is possible for players to cooperate with each other compared with the type of video game in which each of a plurality of players causes his/her video game processing apparatus to synchronize them and carry out it.

Further, in the embodiment described above, the video game processing apparatus 100 is configured so as to: receive a battle command corresponding to the action to cause the player character to carry out in a turn-based battle according to other video game processing apparatus (for example, Step S202); and transmit the summoned admissibility information in which the received battle command is associated with the player character to the other video game processing apparatus (Step S205). Therefore, it becomes possible to reduce a work burden of each friend required for cooperation with friends. In particular, as was been explained in the embodiment described above, by configuring it so as to carry out the process according to the command for which the selection is received during the battle (for example, Step S203), it is possible to cause the battle to proceed along with update of the information to be transmitted to the friend. Therefore, it becomes possible to reduce a load of the friend compared with a configuration so as to display a dedicated screen for updating the information to be transmitted to the friend.

In this regard, in the embodiment described above, the case where the process according to the command for which the selection is received is carried out during the battle (for example, Step S203) has been described as an example. However, the video game processing apparatus 100 may be configured so as to receive a battle command corresponding to an action to cause the player character to carry out in the turn-based battle according to other video game processing apparatus thus specified at battle command reception timing in the turn-based battle in place of the battle command corresponding to the action to cause the player character to carry out in the turn-based battle. By configuring it in such a manner, the player can cooperate with a friend by a simple operation. Further, since it is configured so as to receive a battle command corresponding to an action to cause his/her own player character to carry out in a battle of his/her friend in place of a battle command corresponding to an action to cause the player character to carry out in his/her own battle, it is possible to provide compensation when to cooperate with the friend, and this makes it possible to expand the range of the game by configuring it so as to skip a turn of the player character in the battle of the player, in particular, in a case where the battle command is received.

In this regard, although it has not been mentioned particularly in the embodiment described above, the video game processing apparatus 100 may be configured so as to: include the friend information storage section for storing the friend information including the closeness with the other player character (for example, the profile information storage section 12*a* for storing the profile information containing the friend information); receive the update result of the closeness updated in accordance with a predetermined update rule from the other video game processing apparatus in a case where the player character carries out the action in the turn-based battle according to the other video game processing apparatus; and update the closeness in the friend information in accordance with the received update result. By configuring it so that the closeness with the friend is heightened due to summons by the friend, it is possible to urge cooperation between the friends. Further, it becomes possible to provide an incentive for the player to play the video game, such that a level of the player's own player character is increased in order to be readily summoned by the friend. Further, by configuring it so as to provide a predetermined bonus to players whose closeness is high, it becomes possible to urge the cooperation between the players further.

Further, although it has not been mentioned particularly in the embodiment described above, the video game processing apparatus 100 may be configured so as to: include the friend information storage section for storing the friend information including the closeness with the other player character (for example, the profile information storage section 12*a* for storing the profile information containing the friend information); update the closeness with the other player character that is caused to carry out the action in accordance with a predetermined update rule (for example, Step S304); update the closeness in the friend information in accordance with the update result (for example, Step S305); and notify the other video game processing apparatus in which the other player character caused to carry out the action is used as the main character of the update result. By configuring it so as not only to update the closeness in the video game processing apparatus in which the friend is summoned, but also to notify the summoned friend of the update result, it becomes possible to improve the frequency of update of the closeness, and this makes it possible to improve interest of the video game.

Further, in the embodiment described above, the video game processing apparatus 100 is configured so as to: display the usage information selection screen (for example, the friend selection screen) for receiving a selection of the summon admissibility information to be used in a case where the summoning request is received (for example, "Yes" at Step S105) (for example, Step S301); receive a selection of the summon admissibility information used on the usage information selection screen (for example, "Yes" at Step S302); and determine that the received summon admissibility information is the summon admissibility information to be used (for example, Step S303). Therefore, it is possible to provide a video game capable of gaining the cooperation of a friend by means of a simple operation.

In this regard, in the embodiment described above, the case where the video game processing apparatus 100 summons other user who has been registered in advance as a friend at a battle has been described as an example. However, it may be configured so as to be capable of summoning not only the friends but also the other players who play the same video game. In this case, the video game processing apparatus may be configured so as to receive, as the summon admissibility information, the summoned admissibility information, which satisfies a specific summon condition, stored in a video game processing apparatus of other player. In this regard, in this case, it may be configured so as to provide a specific difference (for example, a difference of power, a difference of effect bonus or the like) between the summon admissibility information received from the other player registered as the friend and the summon admissibility information received from other player who is not registered as a friend.

In this regard, although it has not been mentioned particularly in the embodiment described above, the video game processing apparatus 100 may be configured so that a restriction on the number of times the summon admissibility information is received or the number of times a friend is summoned is set up.

In this regard, although it has not been mentioned particularly in the embodiment described above, the video game processing apparatus 100 may be configured so that the enemy character may also carry out action delivery or summons in the enemy character controlling processing (for example, Step S400). In this case, for example, it may be configured so as to: generate, as the summoned admissibility information, information containing an enemy character and a battle command with a predetermined probability; transmit the generated summoned admissibility information to a friend of the player X; include "summons" among the battle commands to be set up to the enemy character when a battle is started in the video game processing apparatus operated by the friend; and cause the enemy character indicated by the summoned admissibility information, which has been generated in the terminal operated by the player X, to carry out the action in place of an action of the enemy character by the friend during the battle, in a case where the "summons" is selected in accordance with a predetermined rule. By configuring it in such a manner, it becomes possible to provide ranges to a method of using the process regarding the friend summons, and this makes it possible to improve interest of the game.

In this regard, in the embodiment described above, the video game processing apparatus 100 is configured so as to carry out various kinds of processings such as the game processing described above on the basis of the game program read out from the game cartridge 20. However, the video game processing apparatus 100 may be configured so as to obtain the game programs via a communication network such as the Internet. Further, the video game processing apparatus 100 may function as a game server, and provide the game program to a game terminal via the communication network.

Further, in the embodiment described above, the video game processing apparatus 100 carries out the various kinds of processes described above in accordance with various kinds of control programs (for example, the video game processing program) stored in a storage device (the storage section 12) with which the video game processing apparatus 100 itself is provided.

Further, in the embodiment described above, it may be configured so that the video game control server 200 plays a part of roles that the plurality of video game processing apparatuses 100 to 10N should play, or so that each of the plurality of video game processing apparatuses 100 to 10N plays a part or all of roles that the video game control server should play.

INDUSTRIAL APPLICABILITY

The present invention is useful to urge players to cooperate with each other.

EXPLANATION OF REFERENCE NUMERALS

10 GAME PROGRAM READING SECTION
11 CONTROL SECTION
12 STORAGE SECTION
13 DISPLAY SECTION
14 AUDIO OUTPUT SECTION
15 PLAYER OPERATION RECEIVING SECTION
16 COMMUNICATION SECTION
20 GAME CARTRIDGE
50 COMMUNICATION NETWORK
100 to 10N VIDEO GAME PROCESSING APPARATUS
200 VIDEO GAME CONTROL SERVER

What is claimed is:

1. A video game processing apparatus for controlling progress of a video game while displaying a player character on a display screen of a display device, the progress of the video game including a battle against an enemy character, the video game processing apparatus comprising:

a memory for storing summon admissibility information and a closeness relationship between the player character and an other player character, the summon admissibility information indicating the other player character and a battle command associated with the other player character, the battle command corresponding to an action to be carried out in the battle by the other player character against the enemy character, the battle being a turn-based battle, a turn of the player character progressing upon receipt of at least one of a plurality of battle commands, the plurality of battle commands including at least one fight action;

a network connection for receiving the summon admissibility information from an other video game processing apparatus, the other player character being controlled by the other video game processing apparatus;

the network connection for further receiving, during the turn of the player character in the battle, a selection of a summoning request, the summoning request indicating a usage request of the summon admissibility information, the summoning request being one of the plurality of battle commands, the turn of the player character being ended by the summoning request being selected;

a processor for determining the summon admissibility information in a case where the summoning request is selected;

the processor for summoning the other player character indicated by the summon admissibility information and causing the other player character, controlled by the other video game processing apparatus, to carry out the action, corresponding to the battle command associated with the other player character by the summon admissibility information, in the battle against the enemy character;

the processor for updating the closeness relationship between the player character and the other player character in response to the other player character being summoned during the video game; and the network connection for notifying the other video game processing apparatus of an update result of the closeness relationship between the player character and the other player character, wherein the processor causes the other player character to carry out the action without synchronizing with the other video game processing apparatus.

2. The video game processing apparatus according to claim 1, further comprising:

the network connection for further receiving one of the plurality of battle commands corresponding to an action that the player character is caused to carry out in a battle according to the other video game processing apparatus; and the network connection for transmitting summoned admissibility information toward the other video game processing apparatus, the one of the plurality of battle commands received by the network connection being associated with the player character in the summoned admissibility information.

3. The video game processing apparatus according to claim 2, wherein the network connection receives, at battle command reception timing in the battle, the one of the plurality of battle commands corresponding to the action that the player character is caused to carry out in the battle according to the other video game processing apparatus.

4. The video game processing apparatus according to claim 2, wherein
the memory stores friend information, the friend information containing the closeness relationship between the player character and the other player character, the closeness relationship indicating a degree of intimacy between the video game processing apparatus and the other video game processing apparatus;
the network connection receives a second update result of the closeness relationship updated in accordance with a predetermined update rule from the other video game processing apparatus in a case where the player character carries out the action in the battle according to the other video game processing apparatus; and
the processor updates the closeness relationship in the friend information in accordance with the second update result received by the network connection.

5. The video game processing apparatus according to claim 1, wherein
the memory stores friend information, the friend information containing the closeness relationship between the player character and the other player character, the closeness relationship indicating a degree of intimacy between the video game processing apparatus and the other video game processing apparatus, and
the processor updates, in accordance with a predetermined update rule, the closeness relationship between the player character and the other player character that is caused to carry out the action.

6. The video game processing apparatus according to claim 1, further comprising:
the display device for displaying a usage information selection screen for receiving a selection of the summon admissibility information to be used in a case where the summoning request is received,
wherein the network connection receives a selection of the summon admissibility information to be used on the usage information selection screen, and
the processor determines the summon admissibility information received by the network connection as the summon admissibility information to be used.

7. The video game processing apparatus according to claim 1, wherein the other video game processing apparatus transmits the summon admissibility information to a video game processing server, and the network connection receives the summon admissibility information via the video game processing server.

8. The video game processing apparatus according to claim 7, wherein the network connection receives the summon admissibility information from the video game processing server in accordance with identification information that uniquely specifies an originating other video game processing apparatus, and the identification information is associated with the summon admissibility information.

9. The video game processing apparatus according to claim 7, wherein the other player character includes characters operated by a friend player and a player different than the friend player, and the friend player is registered in advance by the video game processing apparatus.

10. The video game processing apparatus according to claim 9, wherein the network connection receives the summon admissibility information transmitted by the other video game processing apparatus operated by the friend player from the video game processing server.

11. The video game processing apparatus according to claim 9, wherein an effect of the action to be carried out by the other player character operated by the friend player is different than an effect of the action to be carried out by the other player character operated by the player different than the friend player.

12. The video game processing apparatus according to claim 1, wherein the other player character controlled by the other video game processing apparatus is a main character in the other video game processing apparatus.

13. The video game processing apparatus according to claim 1, wherein the processor increases the closeness relationship between the player character and the other player character in response to the other player character being summoned during the video game.

14. The video game processing apparatus according to claim 1, wherein the closeness relationship includes a predetermined number of steps.

15. The video game processing apparatus according to claim 14, wherein the processor increases the closeness relationship, between the player character and the other player character and among the predetermined number of steps, in response to the other player character being summoned a number of times during the video game.

16. The video game processing apparatus according to claim 1, wherein an effect of summoning the other player character is enhanced as the closeness relationship becomes higher.

17. The video game processing apparatus according to claim 1, wherein an effect of the action that is carried out by the other player character in the battle against the enemy character is determined based on the closeness relationship between the player character and the other player character.

18. A non-transitory computer-readable medium including a video game processing program product for causing a computer to control progress of a video game while displaying a player character on a display screen of a display device, the progress of the video game including a battle against an enemy character,
the computer comprising a memory for storing summon admissibility information and a closeness relationship between the player character and an other player character, the summon admissibility information indicating the other player character and a battle command associated with the other player character, the battle command corresponding to an action to be carried out in the battle by the other player character against the enemy character, the battle being a turn-based battle, a turn of the player character progressing upon receipt of at least one of a plurality of battle commands, the plurality of battle commands including at least one fight action,
the video game processing program product causing the computer to execute:
receiving the summon admissibility information from an other video game processing apparatus, the other player character being controlled by the other video game processing apparatus;
receiving, during the turn of the player character in the battle, a selection of a summoning request, the summoning request indicating a usage request of the summon admissibility information, the summoning request being one of the plurality of battle commands, the turn of the player character being ended by the summoning request being selected;

determining the summon admissibility information in a case where the summoning request is selected;

summoning the other player character indicated by the summon admissibility information and causing the other player character, controlled by the other video game processing apparatus, to carry out the action, corresponding to the battle command associated with the other player character by the summon admissibility information, in the battle against the enemy character;

updating the closeness relationship between the player character and the other player character in response to the other player character being summoned during the video game; and notifying the other video game processing apparatus of an update result of the closeness relationship between the player character and the other player character, wherein the processor causes the other player character to carry out the action without synchronizing with the other video game processing apparatus.

* * * * *